(12) United States Patent
Kim (10) Patent No.: US 11,292,531 B2
(45) Date of Patent: Apr. 5, 2022

(54) VEHICLE BODY JOINT STRUCTURE

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 22 days.

(21) Appl. No.: 16/898,707

(22) Filed: Jun. 11, 2020

(65) Prior Publication Data
US 2021/0171124 A1 Jun. 10, 2021

(30) Foreign Application Priority Data
Dec. 4, 2019 (KR) .................. 10-2019-0159934

(51) Int. Cl.
*B62D 27/02* (2006.01)
*B62D 25/02* (2006.01)
*B62D 25/06* (2006.01)

(52) U.S. Cl.
CPC ......... *B62D 27/023* (2013.01); *B62D 25/025* (2013.01); *B62D 25/06* (2013.01)

(58) Field of Classification Search
CPC ........ B62D 25/02; B62D 25/04; B62D 27/02; B62D 27/023; B62D 23/00; B62D 23/005
USPC .............................. 296/205, 203.01, 203.04
See application file for complete search history.

(56) References Cited

U.S. PATENT DOCUMENTS 9,266,569 B1 * 2/2016 Tew ........................ B62D 25/06
10,150,179 B2 * 12/2018 Hofer ................. B23K 20/1265

FOREIGN PATENT DOCUMENTS

KR        20140091510 A        7/2014

\* cited by examiner

*Primary Examiner* — Dennis H Pedder
(74) *Attorney, Agent, or Firm* — Slater Matsil, LLP (57) ABSTRACT

A vehicle body joint structure includes a roof side member extending in a front-rear direction from a side of an upper portion of a vehicle body, a pillar member extending in an up-down direction and matched to a front end or a rear end of the roof side member, a roof rail member laterally extending from the upper portion of the vehicle body and matched with the front end or the rear end of the roof side member, and a connector disposed at the front end or the rear end of the roof side member and fixing the roof side member, the pillar member, and the roof rail member.

20 Claims, 11 Drawing Sheets

VEHICLE BODY JOINT STRUCTURE

CROSS-REFERENCE TO RELATED APPLICATIONS

This application claims priority to Korean Patent Application No. 10-2019-0159934, filed in the Korean Intellectual Property Office on Dec. 4, 2019, which application is hereby incorporated herein by reference.

TECHNICAL FIELD

The present disclosure relates to a vehicle body joint structure.

BACKGROUND

Automotive pillars are classified into a front pillar, a center pillar, and a rear pillar in accordance with the positions of the pillars, and they have not only a function of supporting the roof of a vehicle, but also an important function of improving rigidity and stability of a vehicle body.

According to pillars in the related art, several mold parts are combined to design a monocoque type, so the rigidity is high, but they almost cannot be used as design parts to implement various designs of vehicles and to be shared for segments.

Obviously, in the existing monocoque structure, the entire front pillar can be designed using one draw mold of an inner member and an outer member, but has no expandability for connection with other parts and it is required to develop new molds for each kind and design of vehicles.

That is, many changes in design are required for small production of various kinds and production using a smart factory, and accordingly, there is a problem that the number of molds remarkably increases, so the manufacturing cost is necessarily increased.

Accordingly, there is a need for a vehicle body with a new structure or a new pillar structure that can overcome defects in the related art and can secure expandability for connection with other parts.

The description provided above as related art of the present disclosure is just for helping understanding the background of the present disclosure and should not be construed as being included in the related art known by those skilled in the art.

SUMMARY

The present disclosure relates to a vehicle body joint structure. Particular embodiments relate to a part structure connecting a vehicle body roof and pillars.

The present disclosure has been made in an effort to solve problems in the related art, and an embodiment of the present disclosure provides a vehicle body joint structure that secures convenience in assembly and improves strength and rigidity by being able to apply parts corresponding to a vehicle body roof and pillars according to various kinds of vehicles in various ways because a connector connecting a vehicle body roof and a pillar is commonly used.

In view of the foregoing, a vehicle body joint structure according to embodiments of the present disclosure includes a roof side member extending in a front-rear direction from a side of an upper portion of a vehicle body, a pillar member extending in an up-down direction to be matched to a front end or a rear end of the roof side member, a roof rail member laterally extending from the upper portion of the vehicle body to be matched with the front end or the rear end of the roof side member, and a connector disposed at the front end or the rear end of the roof side member and fixing the roof side member, the pillar member, and the roof rail member.

The pillar member may be positioned under the front end or the rear end of the roof side member and the roof rail member may be positioned at a side of the front end or the rear end of the roof side member, so the pillar member and the roof rail member may be laterally spaced apart from each other with an angle therebetween.

The pillar member may be coupled to a lower portion of the front end or the rear end of the roof side member and the roof rail member may be coupled to a side of the front end or the rear end of the roof side member.

The connector may have a first seat extending in the front-rear direction to seat the roof side member, a second seat extending downward from the first seat to seat the pillar member, and a third seat laterally extending from the first seat to seat the roof rail member.

The first seat may extend in the front-rear direction in a shape curved to surround a surface of the roof side member, the second seat may be formed to surround the pillar member, and the third seat may be formed to surround the roof rail member.

The connector may have a diverging portion to which the first seat, the second seat, and the third seat are connected, and the first seat, the second seat, and the third seat may extend in different directions from the diverging portion.

The pillar member may be formed such that an end portion connected to the connector is curved in the front-rear direction, and the second seat may be formed in the same direction as the shape of the curved end portion of the pillar member so that the curved end portion of the pillar member is seated.

The connector may have a supporting portion protruding at a position where the first seat and the second seat are matched or a position where the first seat and the third seat are matched, and diverging the seats.

The connector may have a panel portion extending downward from the first seat and having an area that fills a space between the first seat and the second seat.

Several ribs extending in different directions and crossing the area may be formed on the panel portion of the connector.

The connector may have a reinforcing portion extending and curving along the space between the first seat and the third seat and coupled to the first seat and the third seat.

The connector may include a first part having a first mount extending in the front-rear direction to seat the roof side member and a second mount laterally extending from the first mount to seat the roof rail member, and a second part assembled and fixed to the first part and having a third mount for seating the pillar member.

Assembling protrusions may be formed at a lower portion of the first mount of the first part and assembling grooves matched to the assembling protrusions may be formed at an upper portion of the second part.

The assembling protrusions may laterally extend and may have rear ends protruding in the front-rear direction and the assembling grooves may laterally extend and may be open to be matched to the assembling protrusions.

The second part may have flange portions extending in the front-rear direction in the third mount along the first mount and each having an area.

A lattice shape may be formed in the other portion except for the other portions where the roof side member, the pillar member, and the roof rail member are mounted in the connector.

The vehicle body joint structure described above secures convenience in assembly and improves coupling strength and rigidity by being able to apply parts corresponding to a vehicle body roof and pillars according to various kinds of vehicles in various ways because a connector connecting a vehicle body roof and a pillar is commonly used.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

A vehicle body joint structure according to embodiments of the present disclosure is described hereafter with reference to the accompanying drawings.

Figure 1:
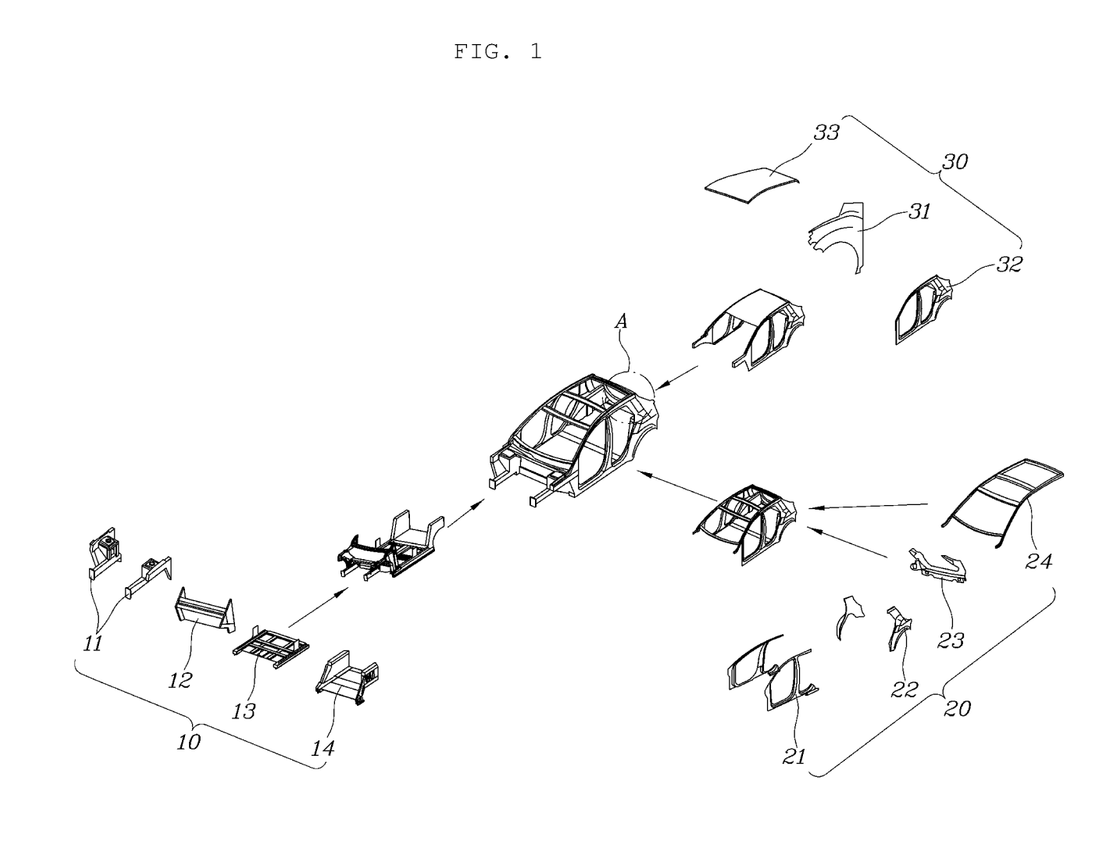
FIG. 1 is a view showing a vehicle body joint structure according to embodiments of the present disclosure.
Figure 2:
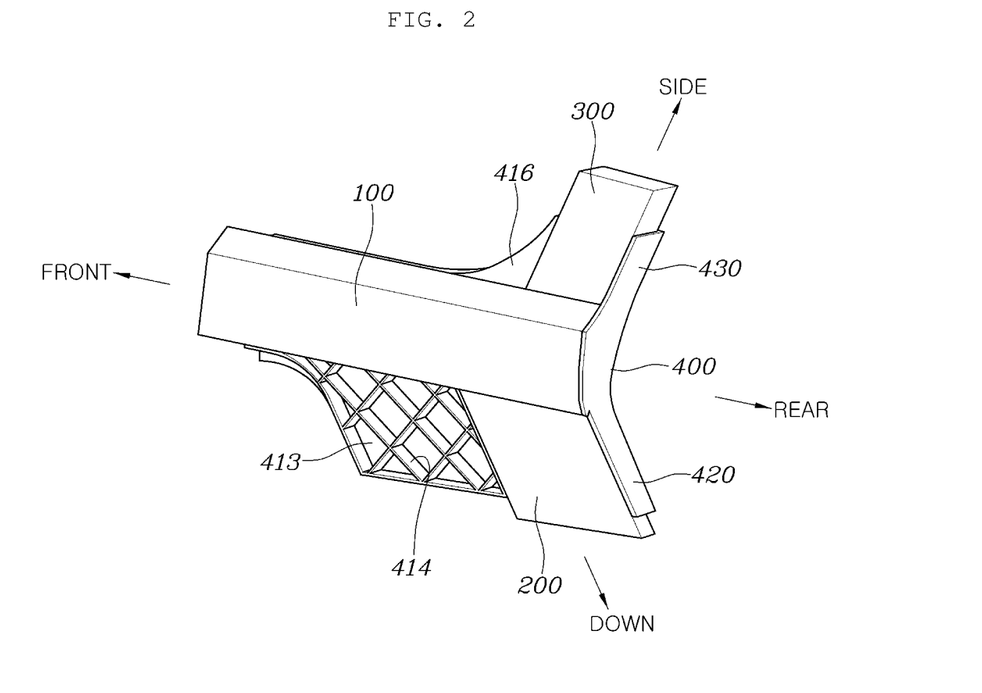
FIGS. 2 to 7 are views showing a first embodiment of a vehicle body joint structure according to the present disclosure.
Figure 3:
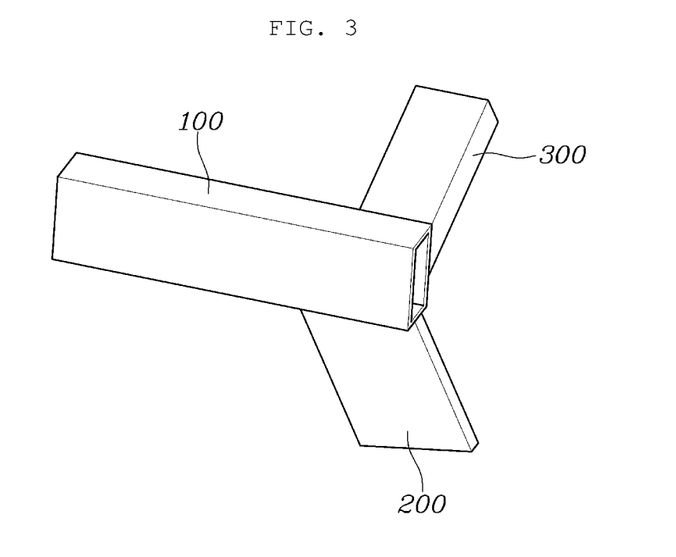

FIG. 1 is a view showing the structure of a vehicle body joint structure according to embodiments of the present disclosure, FIGS. 2 to 7 are views showing a first embodiment of a vehicle body joint structure according to the present disclosure, FIGS. 8 to 11 are views showing a second embodiment of a vehicle body joint structure according to the present disclosure, and FIGS. 12A to 12D are views showing examples when embodiments of the present disclosure are applied to vehicle body frame structures.

The present disclosure relates to a modularized vehicle body, and in the configuration of a vehicle body, for example, as shown in FIG. 1, a floor assembly 10 is composed of a front assembly 11, a dash assembly 12, a center floor assembly 13, and a rear floor assembly 14, an upper assembly 20 is composed of a front side assembly 21, a rear side assembly 22, a back assembly 23, and a roof assembly 24, and a skin assembly 30 composed of a fender 31, a side outer 32, and a roof panel 33 is combined with the floor assembly 10 and the upper assembly 20, whereby a modularized vehicle can be formed.

The modularized vehicle body is an embodiment. The embodiment is provided only to help the modularized vehicle body. The assembly order and components may be changed when an actual vehicle is formed.

Embodiments of the present disclosure relate to a roof side member 100 and a roof rail member 300, which constitute a roof assembly, and a connector 400 connecting a pillar member 200 to the roof side member and the roof rail member. The roof side member 100, the roof rail member 300, and the connector 400 connecting the pillar member 200 to the roof side member and the roof rail member each have a hollow closed cross-section, thereby forming a space frame structure. Accordingly, the roof side member 100, the pillar member 200, and the roof rail member 300 can be easily applied to various kinds and models of vehicles by adjusting the lengths.

As the shapes of the roof side member 100, the pillar member 200, and the roof rail member 300 are changed in this way, the shapes or sizes of other parts connected to them can be adjusted. Accordingly, it is possible to develop a vehicle body that is suitable for various kinds and models of vehicles, it is possible to more easily develop new types of vehicles, and the present disclosure can be effectively applied to the production of small quantities of various kinds of products.

A vehicle body joint structure according to embodiments of the present disclosure relates to the part A shown in FIG. 1 connected to the roof side member 100, the pillar member 200, and the roof rail member 300 and includes a roof side member 100 extending in a front-rear direction from a side of the upper portion of a vehicle body, a pillar member 200 extending in an up-down direction to be matched to the front end or the rear end of the roof side member 100, a roof rail member 300 laterally extending from the upper portion of the vehicle body to be matched with the front end or the rear end of the roof side member 100, and a connector 400 disposed at the front end or the rear end of the roof side member 100 and fixing the roof side member 100, the pillar member 200, and the roof rail member 300.

As shown in FIGS. 2 to 5, the roof side member 100, the pillar member 200, and the roof rail member 300 are combined through the connector 400. That is, the roof side member 100, extending in the front-rear direction from a side of the upper portion of the vehicle body, the pillar member 200 extending in the up-down direction and forming an A-pillar or a C-pillar, and the roof rail member 300 connecting the roof side members 100 at both sides are connected through the connector 400, whereby it is possible to achieve a modularized vehicle body through the connector 400 even if the roof side member 100, the pillar member 200, and the roof rail member 300 are changed in accordance with the kinds and models of vehicles.

As described above, the pillar member 200 is positioned under the front end or the rear end of the roof side member 100 extending in the forward direction and the roof rail member 300 is positioned at a side of the front end or the rear end of the roof side member 100. As described above, the roof side member 100 is coupled to the connector 400, the pillar member 200 is coupled to the lower portion of the roof side member 100, and the roof rail member 300 is connected to a side of the roof side member 100, whereby rigidity and strength at the joints of the members are secured. The connector 400 extends in the front-rear direction so that the roof side member 100 is seated thereon, and the pillar member 200 and the roof rail member 300 are spaced apart from each other with a predetermined angle therebetween around the roof side member 100, so a curved shape can be achieved such that the pillar member 200 and the roof rail member 300 can be seated.

The roof side member 100, the pillar member 200, and the roof rail member 300 seated on the connector 400 can be coupled to each other. That is, the pillar member 200 is coupled to the lower portion of the front end or the rear end of the roof side member 100 and the roof rail member 300 is coupled to a side of the front end or the rear end, whereby a strong coupling structure is achieved through the coupling of the members. Accordingly, rigidity and strength are secured at the joints by the connector 400.

The coupling structure of the connector 400, the roof side member 100, the pillar member 200, and the roof rail member 300 can be achieved in various embodiments.

Figure 4:
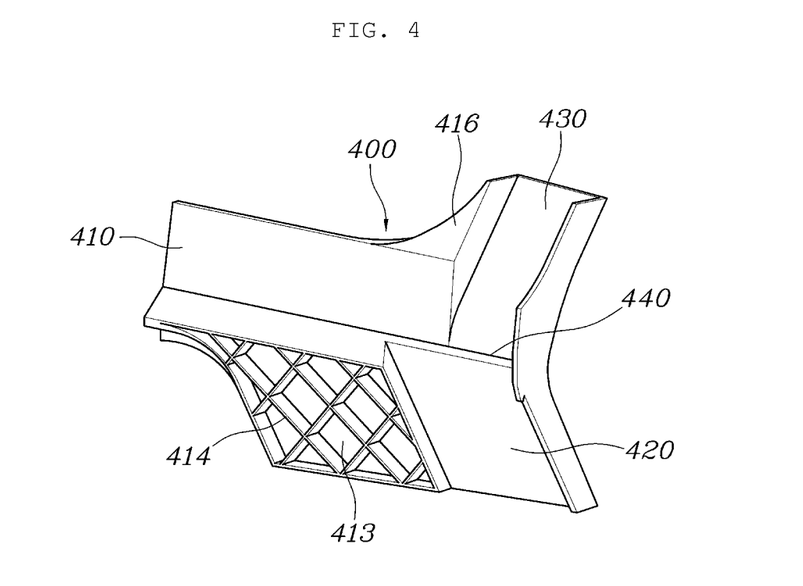

As an embodiment, as shown in FIG. 4, the connector 400 may have a first seat 410 extending in the front-rear direction to seat the roof side member 100, a second seat extending downward from the first seat 410 to seat the pillar member 200, and a third seat 430 laterally extending from the first seat 410 to seat the roof rail member 300.

As described above, the connector 400 has the first seat 410, the second seat 420, and the third seat 430, in which the first seat 410 extends in the front-rear direction to be able to seat the roof side member 100, the second seat 420 extends downward from the first seat 410 to seat the pillar member 200, and the third seat 430 laterally extends from the first seat 410 to seat the roof rail member 300. The pillar member 200 vertically supports the vehicle body, the roof rail member 300 horizontally extends, and the second seat 420 on which the pillar member 200 is seated and the third seat 430 on which the roof rail member 300 is seated are spaced apart from each other with a predetermined angle around the first seat 410, so the connector member can be curved.

The first seat 410 may extend in the front-rear direction in a shape curved to surround a surface of the roof side member 100, the second seat 420 may be formed to surround the pillar member 200, and the third seat 430 may be formed to surround the roof rail member 300.

That is, as can be seen from FIG. 4, the first seat 410 is curved in an L-shape to surround a surface of the roof side member 100, so the roof side member 100 is firmly coupled to the first seat 410, and the second seat 420 and the third seat 430 may have seat surfaces extending along the pillar member 200 and the roof rail member 300 and sides bending at both sides of the seat surfaces, respectively. Accordingly, the members can be strongly coupled to the seats of the connector 400.

The connector 400 has a diverging portion 440 to which the first seat 410, the second seat 420, and the third seat 430 are connected, and the first seat 410, the second seat 42o, and the third seat 430 can extend in different directions from the diverging portion.

As described above, since all of the roof side member 100, the pillar member 200, and the roof rail member 300 are coupled to the diverging portion 440 of the connector 400, coupling is easy, and coupling strength and rigidity are secured. That is, the diverging portion 440 of the connector 400 is the portion to which the first seat 410, the second seat 420, and the third seat 430 are connected, and the roof side member 100, the pillar member 200, and the roof rail member 300 are supported and matched with each other through the diverging portion 440, whereby a firm vehicle joint structure can be formed.

Figure 5:
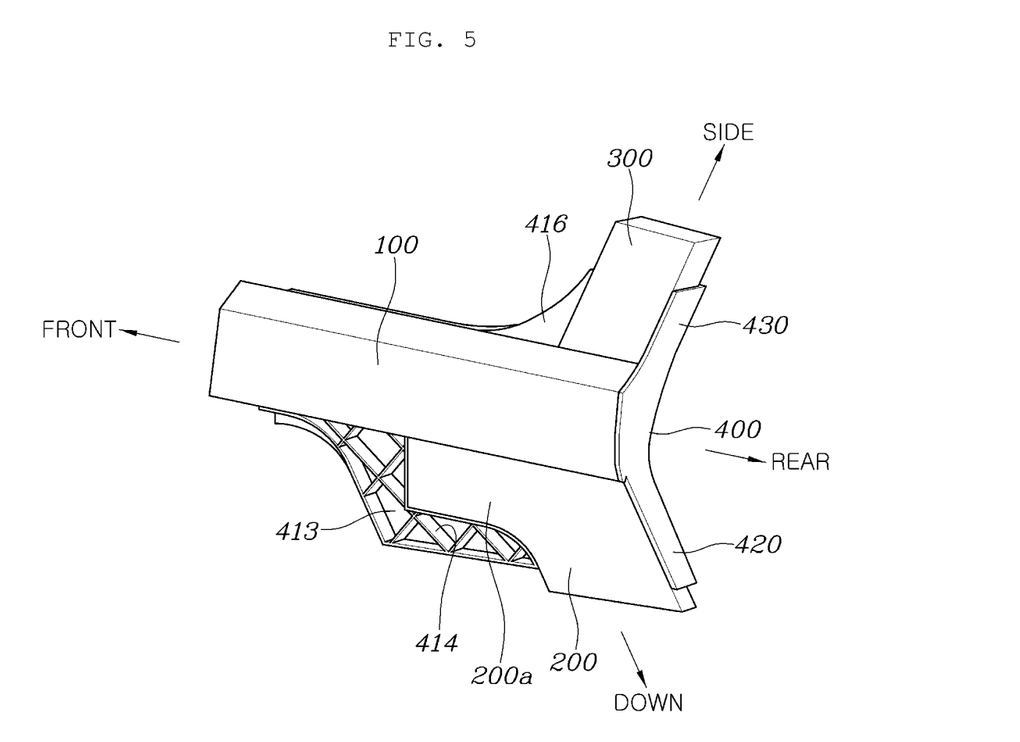

Meanwhile, as shown in FIG. 5, the pillar member 200 is formed such that an end portion 200a connected to the connector 400 is curved in the front-rear direction and the second seat 420 is formed in the same direction as the shape of the curved end portion of the pillar member 200 so that the curved end portion of the pillar member 200 is seated.

As described above, since the pillar member 200 is formed such that the end portion 200a connected to the connector 400 is curved forward or rearward, the contact area with the connector 400 increases, so coupling rigidity is secured. Accordingly, the second seat 420 of the connector 400 can be formed to have the same shape as the shape of the curved end portion of the pillar member 200, and when the pillar member 200 is seated on the second seat 420, supporting strength in the front-rear direction and the up-down direction is secured.

Figure 6:
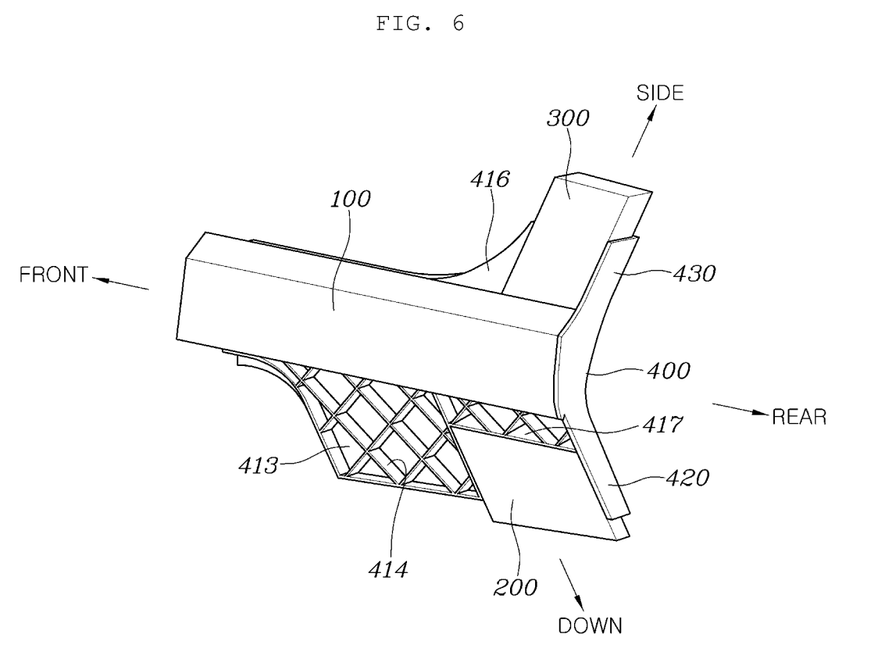

On the other hand, as shown in FIG. 6, the connector 400 may have a supporting portion 417 protruding at the position where the first seat 410 and the second seat 420 are matched or the position where the first seat 410 and the third seat 430 are matched, and diverging the seats.

As described above, since the supporting portion 417 is formed at the connector 400, and the first seat 410 and the second seat 420 or the first seat 410 and the third seat 430 are diverged by the supporting portion 417, the pillar member 200 and the roof rail member 300 are spaced apart from the roof side member 100. Accordingly, the pillar member 200 and the roof rail member 300 are spaced, without coupling, apart from the roof side member 100 in contact with the supporting portion 417, so the pillar member 200 or the roof rail member 300 can be coupled to the roof side member 100 through the connector 400. As described above, since the pillar member 200 or the roof rail member 300 is coupled to the roof side member 100 through the connector 400, strength and rigidity are secured.

Figure 7:
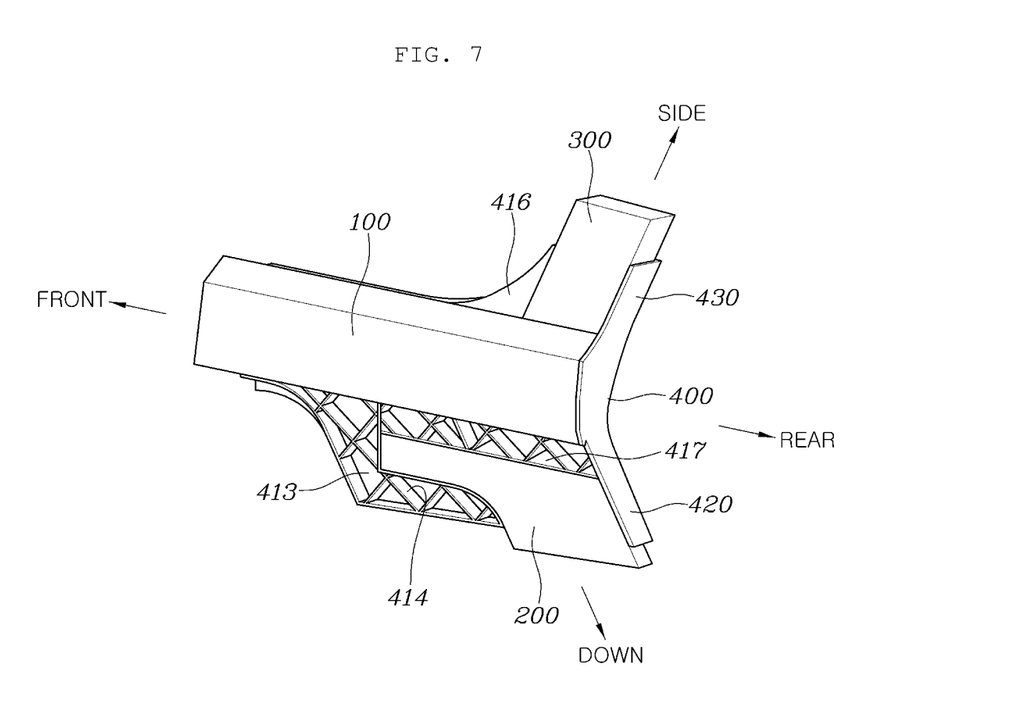
Figure 8:
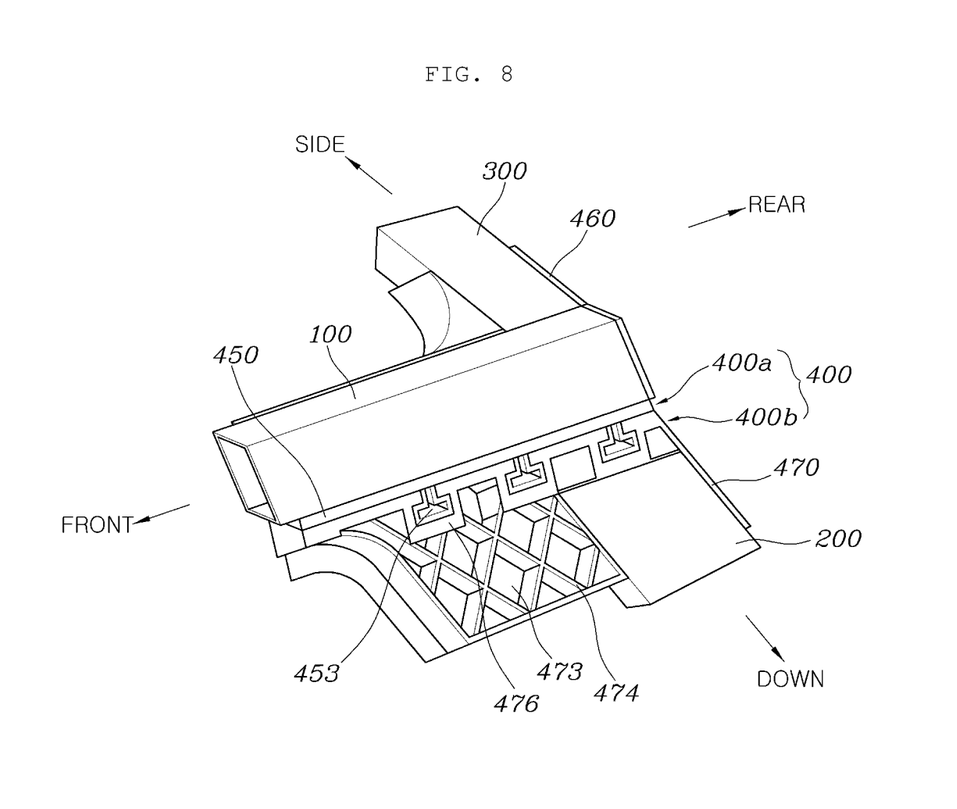
FIGS. 8 to 11 are views showing a second embodiment of a vehicle body joint structure according to the present disclosure.
Figure 9:
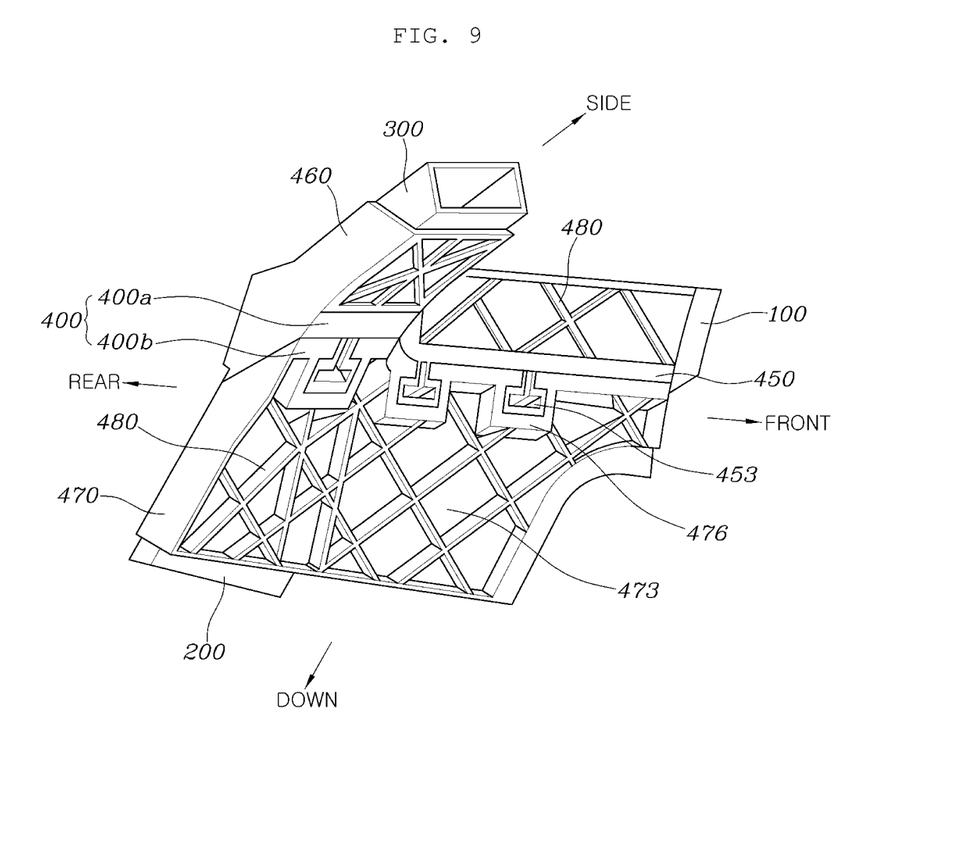
Figure 10:
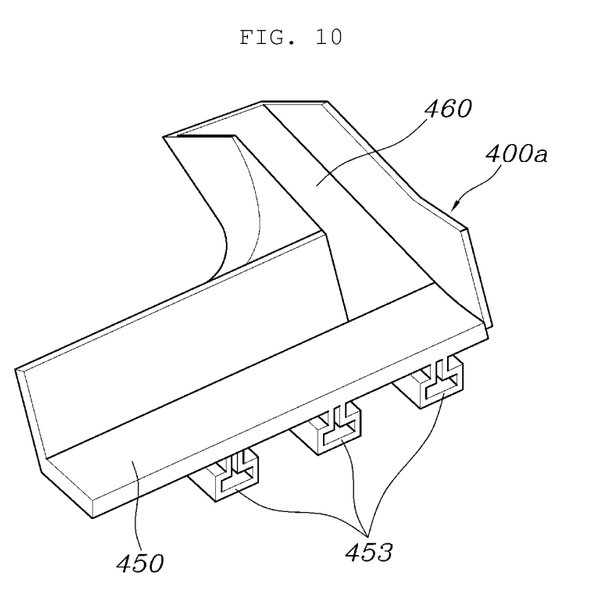
Figure 11:
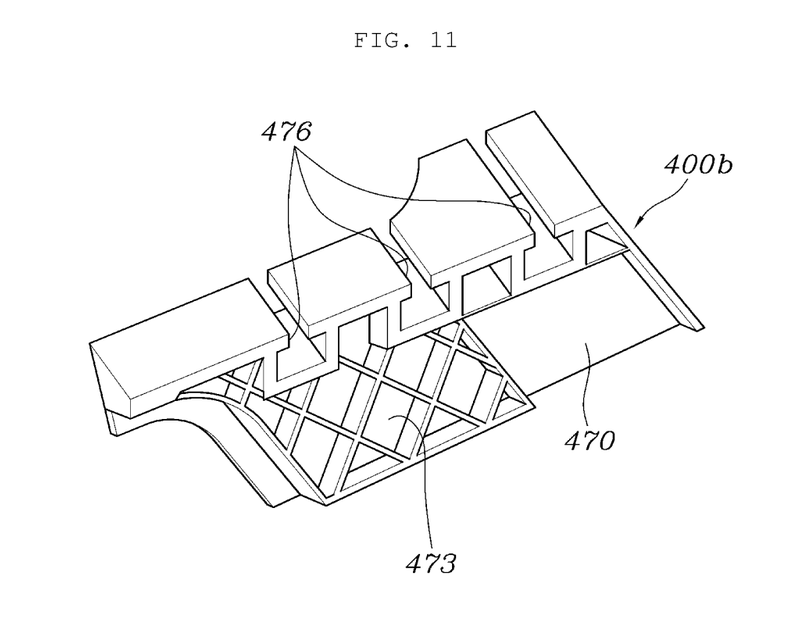
Figure 12A:
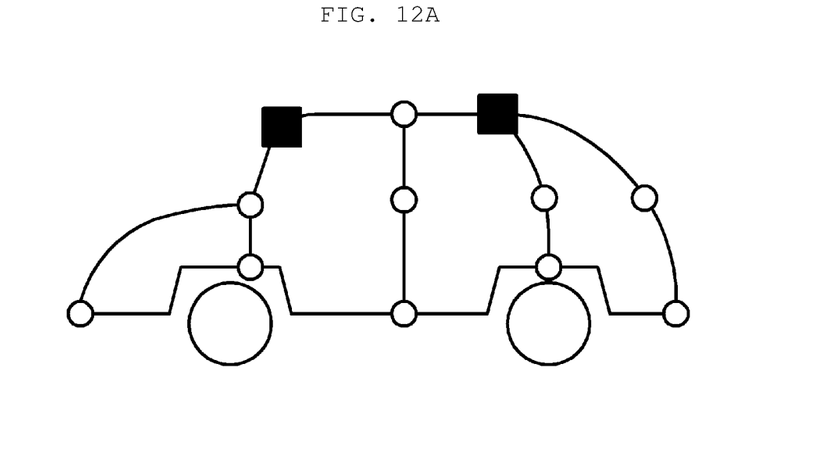
FIGS. 12A to 12D are views showing examples when embodiments of the present disclosure are applied to vehicle body frame structures.
Figure 12B:
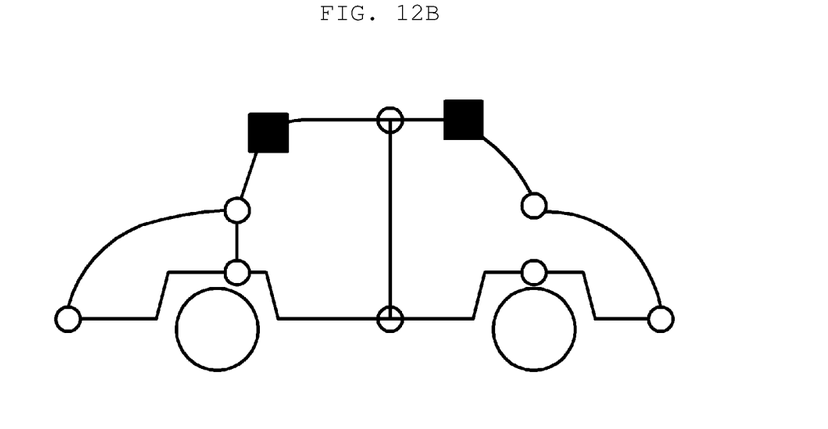
Figure 12C:
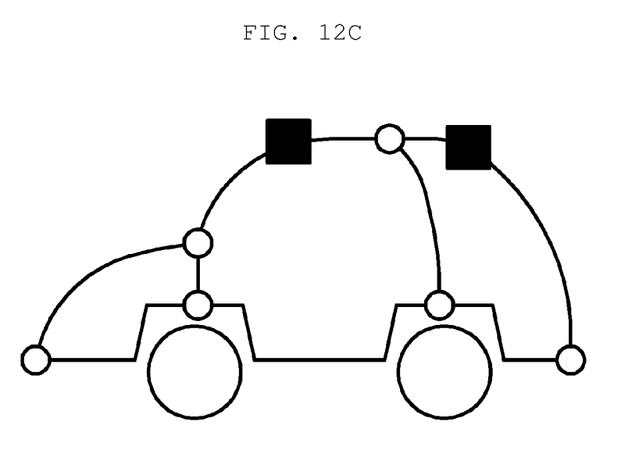
Figure 12D:
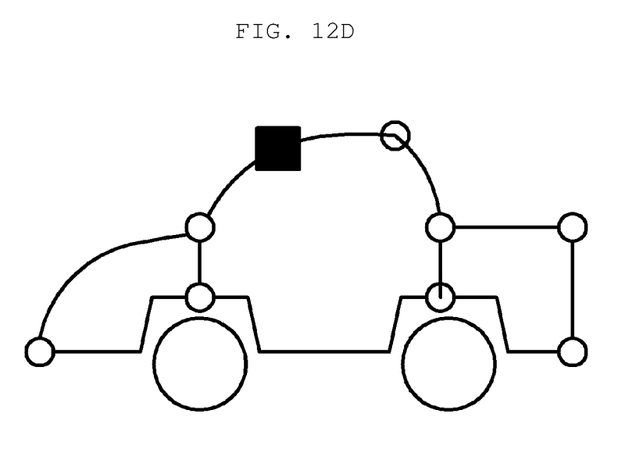

The supporting portion 417, as can be seen from FIG. 7, can be changed in accordance with the shape of the pillar member 200. That is, when the shapes of the roof side member 100, the pillar member 200, and the roof rail member 300 are changed in accordance with the kinds and models of vehicles, it is possible to form a connection structure by changing the connector 400 in accordance with the shapes of the members.

On the other hand, as can be seen from FIG. 4, the connector 400 may have a panel portion 413 extending downward from the first seat 410 and having an area that fills the space between the first seat 410 and the second seat 420.

As described above, because the panel portion 413 having the area is formed at the connector 400, strength and rigidity thereof are secured. In particular, large rigidity is required for the pillar member 200 supporting the roof assembly 24, so it is possible to further secure supporting rigidity for the pillar member 200 mounted on the connector 400 by forming the panel portion 413 in the space between the first seat 410 of the connector 400 on which the roof side member 100 is seated and the second seat 420 on which the pillar member 200 is seated.

Several ribs 414 extending in different directions and crossing the area may be formed on the panel portion 413 of the connector 400. The several ribs 414 may be changed in thickness and shape in accordance with required rigidity of the connector 400 and form several polygonal or circular shapes with respect to the area of the panel portion 413 so that the strength and rigidity of the entire connector 400 can be secured because the rigidity of the panel portion 413 is secured.

As described above, since the connector 400 has the panel portion 413 in the space between the first seat 410 and the second seat 420, the strength and rigidity of the roof side member 100 and the pillar member 200 are secured, so the roof assembly 24 can be provided in a strong coupling structure.

On the other hand, the connector 400 may have a reinforcing portion 416 extending and curving along the space between the first seat 410 and the third seat 430 and coupled to the first seat 410 and the third seat 430. The reinforcing portion 416 is formed to connect the first seat 410 and the third seat 430, so the strength and rigidity of the first seat 410 and the third seat 430 are secured. The necessary coupling rigidity of the roof side member 100 and the roof rail member 300 is less than that of the roof side member 100 and the pillar member 200, but the reinforcing portion 416 connecting the first seat 410 and the third seat 430 having a curved and extending shape is formed on the connector 400, so the necessary rigidity is secured with the smallest increase in weight.

Obviously, the reinforcing portion 416 of the connector 400 may be straight without curving and extending may be applied in various shapes in accordance with the rigidity required when the roof side member 100 and the roof rail member 300 are coupled, whereby the coupling rigidity of the roof side member 100 and the roof rail member 300 can be secured through the connector 400.

On the other hand, as another embodiment of the connector 400, as shown in FIGS. 8 to 11, the connector 400 may include a first part 400a having a first mount 450 extending in the front-rear direction to seat the roof side member 100 and a second mount 460 laterally extending from the first mount 450 to seat the roof rail member 300, and a second part 400b assembled and fixed to the first part 400a and having a third mount 470 for seating the pillar member 200.

As described above, since the connector 400 is composed of the separate first part 400a and second part 400b, it is possible to more freely design vehicle bodies by changing and applying the parts to designs of vehicle bodies.

The first part 400a has a first mount 450 and a second mount 460 to seat the roof side member 100 and the roof rail member 300 constituting the roof assembly. That is, when the design of a vehicle body is changed, the roof side member 100 and the roof rail member 300 are also changed as the configuration of the roof assembly, so the first part 400a has the first mount 450 and the second mount 460 so that the roof side member 100 and the roof rail member 300 can be seated. The pillar member 200 is mounted on the second part 400b assembled to the first part 400a and the second part 400b having the pillar member 200 changed in accordance with the design of a vehicle is assembled to the first part 400a, thereby being able to vary the design of a vehicle body in accordance with the kinds and modes of vehicles.

On the other hand, assembling protrusions 453 may be formed at the lower portion of the first mount 450 of the first part 400a and assembling grooves 476 matched to the assembling protrusions may be formed at the upper portion of the second part 400b. The first part 400a and the second part 400b are coupled to each other by matching the assembling protrusions 453 and the assembling grooves 476, so ease of assembly and assembling strength can be secured.

In detail, the assembling protrusions 453 laterally extend and have rear ends protruding in the front-rear direction and the assembling grooves 476 laterally extend and are open to be matched to the assembling protrusions 453. Accordingly, it is possible to simply assemble the first part 400a and the second part 400b by sliding them with the assembling protrusion 453 and the assembling grooves 476 matched with each other. Further, since the assembling protrusions 453 protrude downward from the first part 400a and have the rear ends protruding in the front-rear direction, they are formed in inverse T-shapes. The assembling grooves 476 are also formed in the same inverse T-shapes to be matched to the assembling protrusion 453, so it is possible to assemble the second part 400b to the first part 400a by laterally sliding the second part 400b, whereby rigidity in the front-rear direction is secured with the first part 400a and the second part 400b assembled.

On the other hand, the second part 400b may have flange portions 473 extending in the front-rear direction in the third mount 470 along the first mount 450 and each having an area.

As described above, since the flange portions 473 each having an area are formed on the second part 400b, the strength and rigidity of the second part 400b are secured. In particular, since high rigidity is required for the pillar member 200 supporting the roof side member wo and the roof rail member 300 constituting the roof assembly, the flange portions 473 are formed on the second part 400b, so supporting rigidity for the first part 400a mounted on the second part 400b is secured. Several ribs 474 extending in different directions and crossing the areas may be formed on the flange portions 473, and the thickness and shape of the several ribs 474 may be changed in accordance with the necessary rigidity of the second part 400b.

On the other hand, a lattice shape 480 may be formed in the other portion except for the other portions where the roof side member 100, the pillar member 200, and the roof rail member 300 are mounted in the connector 400.

As described above, since the lattice-shaped cross-section is formed in the portion except for the other portions where the roof side member 100, the pillar member 200, and the roof rail member 300 are mounted in the connector 400, the entire rigidity is secured. Since the lattice shape avoids the portions where the roof side member 100, the pillar member 200, and the roof rail member 300 are mounted, the coupling rigidity is not decreased when the roof side member 100, the pillar member 200, and the roof rail member 300 are mounted on the connector 400.

The vehicle body joint structure according to the present disclosure can be commonly applied to an A-pillar and a C-pillar. That is, according to various vehicle body frame structures exemplified in FIGS. 12A to 12D, the vehicle body joint structure according to the present disclosure can be applied to the portions indicated by '■' in the vehicle body frames.

That is, the vehicle body joint structure of embodiments of the present disclosure provides a technological base that makes it possible to more easily develop new kinds of vehicles by commonly applying the structure to various kinds of vehicles, as described above, and it is possible to effectively apply the structure to the production of small quantities of various productions.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A vehicle body joint structure comprising:
   a roof side member configured to extend in a front-rear direction from a side of an upper portion of a vehicle body;
   a pillar member extending in an up-down direction and matched to a front end or a rear end of the roof side member;
   a roof rail member laterally configured to extend from the upper portion of the vehicle body and matched with the front end or the rear end of the roof side member; and
   a connector disposed at the front end or the rear end of the roof side member and fixing the roof side member, the pillar member, and the roof rail member, wherein a lattice shape is formed in portions where the roof side member, the pillar member, and the roof rail member are not mounted in the connector.

2. The vehicle body joint structure of claim 1, wherein the pillar member is positioned under the front end or the rear end of the roof side member and the roof rail member is positioned at a side of the front end or the rear end of the roof side member, so the pillar member and the roof rail member are laterally spaced apart from each other with an angle therebetween.

3. The vehicle body joint structure of claim 1, wherein the pillar member is coupled to a lower portion of the front end or the rear end of the roof side member and the roof rail member is coupled to a side of the front end or the rear end of the roof side member.

4. The vehicle body joint structure of claim 1, wherein the connector has a first seat extending in the front-rear direction to seat the roof side member, a second seat extending downward from the first seat to seat the pillar member, and a third seat laterally extending from the first seat to seat the roof rail member.

5. The vehicle body joint structure of claim 4, wherein the first seat extends in the front-rear direction in a shape curved to surround a surface of the roof side member, the second seat is formed to surround the pillar member, and the third seat is formed to surround the roof rail member.

6. The vehicle body joint structure of claim 4, wherein:
the connector has a diverging portion to which the first seat, the second seat, and the third seat are connected; and
the first seat, the second seat, and the third seat extend in different directions from the diverging portion.

7. The vehicle body joint structure of claim 4, wherein:
the pillar member is formed such that an end portion connected to the connector is curved in the front-rear direction; and
the second seat is formed in a same direction as a shape of the curved end portion of the pillar member so that the curved end portion of the pillar member is seated.

8. The vehicle body joint structure of claim 4, wherein the connector has a supporting portion protruding at a position where the first seat and the second seat are matched or a position where the first seat and the third seat are matched, and diverging the seats.

9. The vehicle body joint structure of claim 4, wherein the connector has a panel portion extending downward from the first seat and having an area that fills a space between the first seat and the second seat.

10. The vehicle body joint structure of claim 9, further comprising several ribs formed on the panel portion of the connector and extending in different directions and crossing the area.

11. The vehicle body joint structure of claim 4, wherein the connector has a reinforcing portion extending and curving along a space between the first seat and the third seat and coupled to the first seat and the third seat.

12. The vehicle body joint structure of claim 1, wherein the connector includes:
a first part having a first mount extending in the front-rear direction to seat the roof side member and a second mount laterally extending from the first mount to seat the roof rail member; and
a second part assembled and fixed to the first part and having a third mount for seating the pillar member.

13. The vehicle body joint structure of claim 12, further comprising:
assembling protrusions formed at a lower portion of the first mount of the first part; and
assembling grooves matched to the assembling protrusions formed at an upper portion of the second part.

14. The vehicle body joint structure of claim 13, wherein:
the assembling protrusions laterally extend and have rear ends protruding in the front-rear direction; and
the assembling grooves laterally extend and are open to be matched to the assembling protrusions.

15. The vehicle body joint structure of claim 12, wherein the second part has flange portions extending in the front-rear direction in the third mount along the first mount and each having an area.

16. A vehicle comprising:
a vehicle body; and
a vehicle body joint structure comprising:
a roof side member extending in a front-rear direction from a side of an upper portion of the vehicle body;
a pillar member extending in an up-down direction and matched to an end of the roof side member, wherein the end is a front end or a rear end;
a roof rail member laterally extending from the upper portion of the vehicle body and matched with the end of the roof side member;
a connector disposed at the end of the roof side member and fixing the roof side member, the pillar member, and the roof rail member, a first part of the connector having a first mount extending in the front-rear direction to seat the roof side member and a second mount laterally extending from the first mount to seat the roof rail member and a second part of the connector assembled and fixed to the first part and having a third mount for seating the pillar member;
assembling protrusions formed at a lower portion of the first mount of the first part, wherein the assembling protrusions laterally extend and have rear ends protruding in the front-rear direction; and
assembling grooves matched to the assembling protrusions formed at an upper portion of the second part, wherein the assembling grooves laterally extend and are open to be matched to the assembling protrusions.

17. A vehicle comprising:
a vehicle body; and
a vehicle body joint structure comprising:
a roof side member extending in a front-rear direction from a side of an upper portion of the vehicle body;
a pillar member extending in an up-down direction and matched to an end of the roof side member, wherein the end is a front end or a rear end;
a roof rail member laterally extending from the upper portion of the vehicle body and matched with the end of the roof side member; and
a connector disposed at the end of the roof side member and fixing the roof side member, the pillar member, and the roof rail member, wherein a lattice shape is formed in portions where the roof side member, the pillar member, and the roof rail member are not mounted in the connector.

18. The vehicle of claim 17, wherein:
the pillar member is positioned under the end of the roof side member;
the roof rail member is positioned at a side of the end of the roof side member;
the pillar member and the roof rail member are laterally spaced apart from each other; and
an angle is formed between the pillar member and the roof rail member.

19. The vehicle of claim 18, wherein the connector comprises:

a first seat extending in the front-rear direction to seat the roof side member, wherein the first seat extends in the front-rear direction in a shape curved to surround a surface of the roof side member;
a second seat extending downward from the first seat to seat the pillar member, wherein the second seat is formed to surround the pillar member;
a third seat laterally extending from the first seat to seat the roof rail member, wherein the third seat is formed to surround the roof rail member; and
a diverging portion to which the first seat, the second seat, and the third seat are connected, wherein the first seat, the second seat, and the third seat extend in different directions from the diverging portion.

20. The vehicle of claim 16, wherein a lattice shape is formed in portions where the roof side member, the pillar member, and the roof rail member are not mounted in the connector.

\* \* \* \* \*